United States Patent [19]
Inoue et al.

[11] Patent Number: 6,130,288
[45] Date of Patent: *Oct. 10, 2000

[54] COPOLYMER LATEX AND PROCESS FOR PRODUCING THE SAME

[75] Inventors: Toshihiro Inoue; Yasuhiro Nakano, both of Kawasaki, Japan

[73] Assignee: Nippon Zeon Co Ltd, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/809,786

[22] PCT Filed: Sep. 29, 1995

[86] PCT No.: PCT/JP95/01980

§ 371 Date: Mar. 28, 1997

§ 102(e) Date: Mar. 28, 1997

[87] PCT Pub. No.: WO96/10587

PCT Pub. Date: Apr. 11, 1996

[30] Foreign Application Priority Data

Sep. 30, 1994 [JP] Japan .................................. 6-261809

[51] Int. Cl.⁷ ...................................................... C08L 31/00
[52] U.S. Cl. .......................... 524/556; 524/819; 524/823; 524/832; 524/833; 524/845
[58] Field of Search ...................................... 524/832, 833, 524/845, 819, 821, 823, 824, 560, 556, 561, 562

[56] References Cited

U.S. PATENT DOCUMENTS

| | | | |
|---|---|---|---|
| 2,761,853 | 9/1956 | Uraneck et al. | 524/819 |
| 3,819,557 | 6/1974 | Loeffler et al. | 524/819 |
| 3,843,594 | 10/1974 | Turck | 260/29.7 T |
| 3,950,290 | 4/1976 | Drury, Jr. et al. | 524/819 |
| 4,003,871 | 1/1977 | Costanza et al. | 260/29.7 R |
| 4,489,192 | 12/1984 | Shih et al. | 524/813 |
| 4,528,315 | 7/1985 | Eck et al. | 524/458 |
| 4,590,238 | 5/1986 | Furomoto et al. | 524/745 |
| 4,780,503 | 10/1988 | Mallya | 524/460 |
| 4,898,909 | 2/1990 | Vietmeier et al. | 524/819 |
| 5,147,907 | 9/1992 | Rinck et al. | 524/48 |
| 5,191,009 | 3/1993 | Chen et al. | 524/460 |
| 5,227,423 | 7/1993 | Ingle | 524/458 |

FOREIGN PATENT DOCUMENTS 1910488A 9/1970 Germany .

*Primary Examiner*—Judy M. Reddick

[57] ABSTRACT

A copolymer latex with a total solids content of at least 67% by weight, which is characterized by having a viscosity of 2,000 centipoises or less as measured with a BM viscometer under the conditions of total solids content of 67% by weight and at room temperature, is provided. Such a low viscosity and high solids-content copolymer latex is produced through an emulsion polymerization in which the method of use of the emulsifier and the amount thereof are controlled following specific conditions.

19 Claims, 1 Drawing Sheet

COPOLYMER LATEX AND PROCESS FOR PRODUCING THE SAME

TECHNICAL FIELD

This invention relates to a copolymer latex and a process for producing the same.

BACKGROUND TECHNOLOGY

Copolymer latices have been used in various fields such as paper processing, paints, fibers and adhesives. From the standpoint of resource-saving and energy-saving advocated in recent years, improvements in drying efficiency and productivity of these copolymer latices and reduction in their transportation costs are required, and as a means to meet such requirements, it is necessary to raise concentration of copolymer latices.

As a method for obtaining a high solids-content copolymer latex, it is known to mix a large particle size latex with a small particle size latex. Whereas, such a method necessitates production facilities for two kinds of copolymer latices and facilities for mixing them, which provides a serious drawback to its production. Furthermore, when the latices to be mixed exhibit poor compatibility, the mixture shows low storage stability, and eventually is inferior in its qualities.

Whereas, there is known a process for producing directly through polymerization a copolymer latex containing two groups of particles, each group having different particle sizes (Japanese Patent Publication, [Kokoku] No. Hei 5-31582). This method, however, has problems in productivity, because it requires condensing operations after the polymerization reaction to provide a high solids-content latex and the condensation consumes many hours. Solids content of such copolymer latices obtained upon condensation is about 60 weight percent, and latices of higher solids-content are in demand. Furthermore, because the copolymer latices obtained through this method have small average particle size, the condensation for providing a still higher solids-content latex causes a problem of viscosity rise.

DISCLOSURE OF THE INVENTION

An object of the present invention is to provide a copolymer latex having a low viscosity and a high solids-content of at least 67% by weight, and to provide a process for obtaining a high solids-content copolymer latex through a polymerization step only, without additional operations such as condensation after termination of the polymerization reaction.

Such objects of the present invention can be accomplished by a copolymer latex with a total solids-content of at least 67% by weight, characterized by a viscosity of 2,000 centipoises or less as measured with a BM viscometer under the conditions of total solids content of 67% by weight and at room temperature.

The object of the present invention is also accomplished by a copolymer latex, characterized in that said copolymer is obtained through polymerization of monomers composed of 0.1–10% by weight of an ethylenically unsaturated carboxylic acid monomer or monomers and 90–99.9% by weight of other monomer or monomers copolymerizable therewith, in that said copolymer latex has a volume average particle size of all the particles ranging 500–1,000 nm, in that said copolymer latex comprises two groups of a smaller size particle group (a) consisting of particles whose particle size ranges 50–300 nm and a larger size particle group (b) consisting of particles whose particle size ranges 400–1200 nm, in that the total weight of the particles constituting group (a) and those constituting group (b) is at least 80% of the weight of all the particles, and in that the volumetric ratio of the group (a) particles to the group (b) particles is 10:90–40:60.

Furthermore, the object of the present invention is accomplished by a process for producing the above copolymer latex, which is characterized by continuous addition of, into an aqueous solution of a polymerization initiator containing no emulsifier, a monomeric component composed of 0.1–10% by weight of an ethylenically unsaturated carboxylic acid monomer and 90–99.9% by weight of another monomer copolymerizable therewith, and 0.1–1.5 parts by weight of an emulsifier per 100 parts by weight of the total monomeric component to be used for obtaining the copolymer latex, and further characterized by supplementary addition of 0.1–1 part by weight of the emulsifier per 100 parts by weight of the total monomeric component, in addition to the aforesaid emulsifier, while the amount of the added monomers is within the range of 40–60% by weight of the total monomeric component.

Hereinafter the present invention shall be described in details.

The copolymer latex of the present invention is obtained by polymerization of an ethylenically unsaturated carboxylic acid monomer together with another monomer copolymerizable therewith.

As specific examples of ethylenically unsaturated carboxylic acid monomers, there can be mentioned ethylenically unsaturated monocarboxylic acids such as acrylic acid and methacrylic acid, etc.; ethylenically unsaturated polycarboxylic acids such as itaconic acid, maleic acid, fumaric acid, citraconic acid, etc.; and partially esterified products of ethylenically unsaturated polycarboxylic acids, such as monobutyl fumarate, monobutyl maleate, mono-2-hydroxypropyl maleate, etc. These ethylenically unsaturated carboxylic acid monomers can be used also in the form of alkali metal salts or ammonium salts.

Each ethylenically unsaturated carboxylic acid monomer can be used either solely or in combination of two or more.

The amount of ethylenically unsaturated caroxylic acid monomer(s) is 0.1–10% by weight, preferably 0.5–8% by weight of the total monomer(s) used for obtaining the copolymer latex. When it is less than 0.1% by weight, stability of the copolymer latex during and after the polymerization reaction is lowered, which causes easy agglomerate formation. On the other hand, when it exceeds 10% by weight, the copolymer latex comes to exhibit high viscosity, making it difficult to be concentrated.

As specific examples of other monomers copolymerizable with an ethylenically unsaturated carboxylic acid monomer, there can be mentioned aromatic vinyl monomers such as styrene, α-methylstyrene, vinyltoluene, chlorostyrene, etc.; ethylenically unsaturated nitrile monomers such as acrylonitrile, methacrylonitrile, etc.; ethylenically unsaturated carboxylic acid ester monomers such as methyl (meth)acrylate, ethyl (meth)acrylate, propyl (meth)acrylate, n-amyl (meth)acrylate, isoamyl (meth)acrylate, hexyl (meth)acrylate, ethylhexyl (meth)acrylate, octyl (meth) acrylate, hydroxyethyl (meth)acrylate, hydroxypropyl (meth)acrylate and glycidyl (meth)acrylate, etc.; conjugated diene monomers such as 1,3-butadiene, isoprene, 2,3-dimethyl-1,3-butadiene and 1,3-pentadiene, etc.; ethylenically unsaturated carboxylic acid amide monomers such as (meth)acrylamide and N-methylol (meth)acrylamide, etc.;

vinyl halides such as vinyl chloride; and carboxylic acid vinyl esters such as vinyl acetate, etc.

Among these, aromatic vinyl monomers, ethylenically unsaturated carboxylic acid ester monomers and conjugated diene monomers are preferably used.

These copolymerizable monomers can be used either solely or in combination of two or more.

The amount of other monomer(s) copolymerizable with ethylenically unsaturated carboxylic acid monomers is 90–99.9% by weight, preferably 92–99.5% by weight of the total monomeric component used for obtaining the copolymer latex. When it is less than 90% by weight, the resulting copolymer latex comes to have a high viscosity and its concentration becomes difficult. Whereas, when it exceeds 99.9% by weight, stability of the copolymer latex during and after the polymerization reaction is impaired, which is apt to cause agglomerate formation.

According to the invention, an ethylenically unsaturated carboxylic acid monomer(s), other monomer(s) copolymerizable therewith and an emulsifier are added at first into an aqueous solution containing a polymerization initiator but no emulsifier, to start the polymerization.

Then the monomers and the emulsifier are simultaneously and concurrently added to advance the polymerization. The monomers and the emulsifier may be added separately or, in the form of a monomeric emulsion obtained by mixing the monomers, emulsifier and water. When the monomers and the emulsifier are added separately, the time required from the initiation to the termination of their addition should preferably be the same.

The addition of monomers and emulsifier is effected continuously or intermittently.

The time required for the addition of the monomers or monomeric emulsion is at least an hour, preferably 2 hours or more. When the time consumed for addition of the monomers or monomeric emulsion is less than one hour, in some cases the intended particle size distribution cannot be obtained and it becomes difficult to increase the concentration.

In the present invention, it is important that no emulsifier exists in the aqueous solution in which a polymerization initiator is dissolved, at the initiation time of the polymerization. When an emulsifier is present in the aqueous solution dissolving the polymerization initiator, volume average particle size of the copolymer latex is reduced to raise the latex viscosity, making it difficult to increase the concentration of the latex.

The polymerization initiator to be used in the present invention is subject to no specific limitation. As specific examples, there can be mentioned water-soluble initiators such as potassium persulfate, sodium persulfate, ammonium persulfate, hydrogen peroxide, etc.; oil-soluble initiators such as benzoyl peroxide, di-t-butyl peroxide, 2,2-azobis-2,4-dimethylvarelonitrile, azobisisobutyronitrile, etc.; redox initiators in which peroxides are combined with reducing agents such as sodium bisulfite or the like.

Of these, water-soluble initiators are preferred, and those persulfates are most conveniently used.

The amount of the polymerization initiator is subject to no specific limitation. It usually ranges 0.05–3% by weight, preferably 0.1–2% by weight, to the total monomers used for obtaining the copolymer latex.

Examples of emulsifiers to be added, to an aqueous solution of a polymerization initiator, with ethylenically unsaturated carboxylic acid monomer(s) and other monomer(s) copolymerizable therewith, include anionic surfactants such as sulfuric acid esters of higher alcohols, alkylbenzenesulfonates, aliphatic sulfonates, polyoxyethylene-alkylarylsulfonates and polyphosphates, etc.; nonionic surfactants such as alkyl esters, alkyl phenyl ethers or alkyl ethers of polyethylene glycol, etc.

Of these, anionic surfactants are preferably used.

These emulsifiers may be used either singly or in combination of two or more.

The amount of the emulsifier(s) to be added, to the aqueous solution of a polymerization initiator containing no emulsifier, simultaneously and concurrently with the monomers is not more than 2 parts, preferably 0.1–1.5 parts by weight, to 100 parts by weight of the total monomers used for obtaining the copolymer latex. When the amount of added emulsifier exceeds 2 parts by weight, particle size of the larger size particle group of the copolymer latex becomes small and the viscosity rises, which makes it difficult to increase the solids-content of the latex.

According to the invention, when the amount of added monomers reaches 40–60% by weight, preferably 45–55% by weight, of the total monomers to be used for obtaining the copolymer latex, the supplementary emulsifier is further added separately and the polymerization is continued.

When the supplementary addition of the emulsifier is effected at the time at which the amount of added monomers is less than 40% by weight of said total monomers, the volumetric ratio of the particles constituting the smaller size particle group exceeds 40% to increase viscosity of the copolymer latex, and it becomes difficult to increase solids-content of the latex.

Whereas, when more than 60% by weight of the total monomers have been added before the supplementary addition of the emulsifier, the volumetric ratio of the particles constituting the smaller size particle group becomes less than 10% to increase viscosity of the copolymer latex, again rendering it difficult to increase solids-content of the latex.

The method of the supplementary addition of the emulsifier may be such that the total amount is added at once, or continuously or intermittently.

As the emulsifier to be supplementarily added, those emulsifiers as exemplified as emulsifiers to be added simultaneously and concurrently with the monomers can be mentioned. Preferably, identical emulsifier(s) are used.

The amount of the emulsifier to be supplementarily added is 0.1–1 part by weight, preferably 0.2–0.8 part by weight, per 100 parts by weight of the total monomers used for obtaining the copolymer latex. When the amount of the emulsifier deviates from the above range, viscosity of the copolymer latex after termination of the polymerization reaction becomes high and makes it difficult to increase its solids-content.

According to the invention, it is also permissible to supplementarily add a polymerization initiator at an occasion(s) other than the initiation of the polymerization, and whereby a copolymer latex having a large volumetric ratio of the particles constituting the smaller size particle group can be effectively obtained. The initiator may be added separately or as a mixture with a monomer.

The thus obtained copolymer latex possesses the physical properties listed as (a)–(f) below. Their measuring methods and measuring conditions are as described in the later appearing working Examples.

(a) The particle size distribution of the copolymer latex is comprised of a smaller size particle group (a) and a larger size particle group (b). When the particle size distribution is measured with a light scattering-type particle size measuring instrument, the particle size of the smaller size particle group (a) ranges 50–300 nm, e.g., 100–300 nm, and that of the larger size particle group (b) ranges 400–1200 nm e.g. 500 to 1200 nm.

(b) The volume average particle size of all the particles of the copolymer latex is 500–1000 nm.

(c) The sum of the particles constituting the smaller size particle group (a) and those constituting the larger size particle group (b) is at least 80% by weight of all the particles.

(d) The volumetric ratio of the particles constituting the small size particle group (a) to those constituting the large size particle group (b) ranges 10:90–40:60.

(e) The viscosity of the copolymer latex as measured with a BM viscometer under the condition of total solids content of 67% by weight and at room temperature is not higher than 2,000 centipoises.

(f) The total solids content of the copolymer latex is at least 67% by weight.

[Industrial Utilizability]

The thus obtained copolymer latices of the present invention have low viscosity and high solids content, and therefore can be conveniently used for such usages as paints, adhesives, etc.

Figure 1:
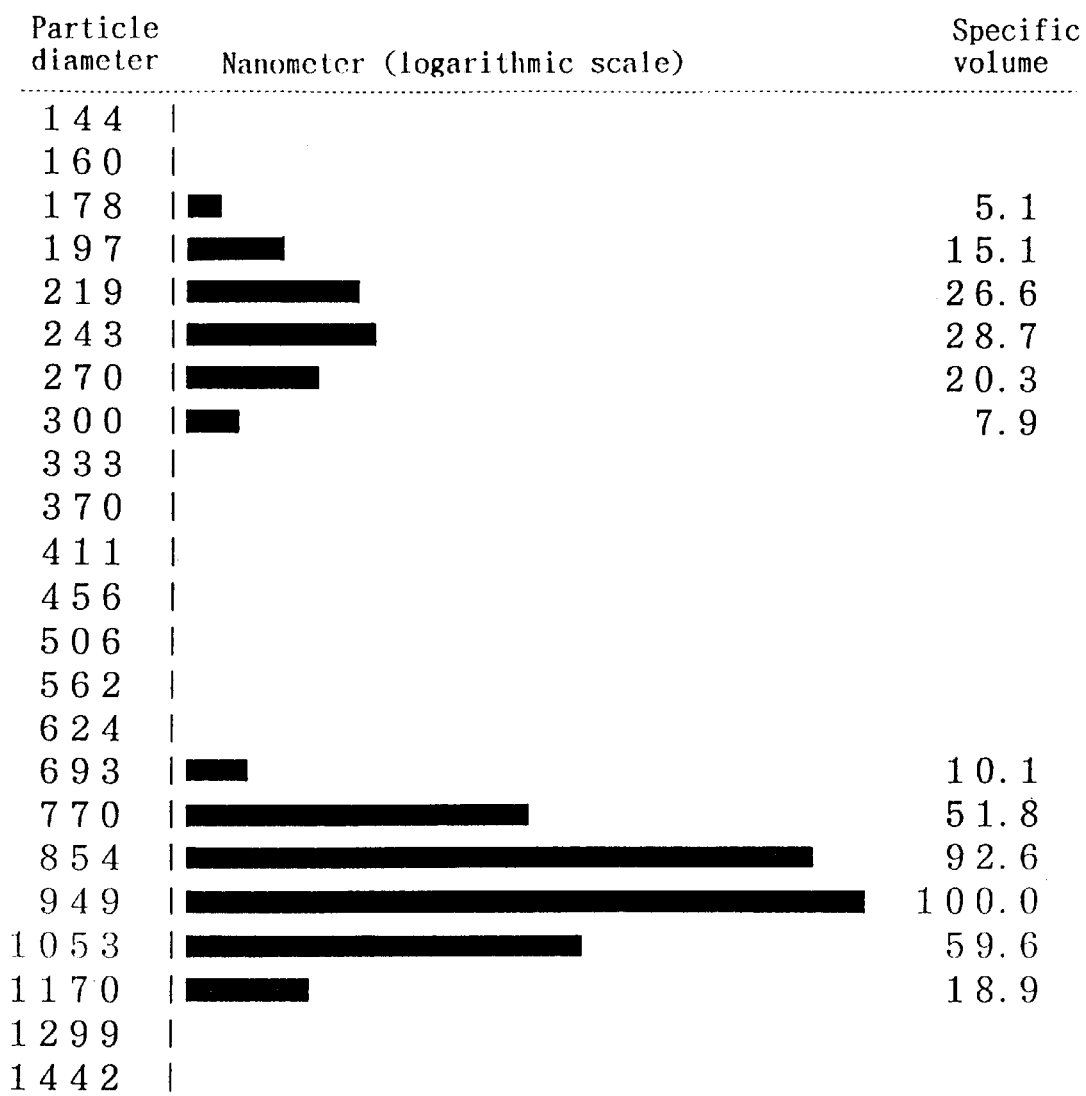
FIG. 1 shows the result of measuring the particle size distribution of the copolymer latex obtained in Example 1, with a light-scattering type particle size measuring instrument.

The vertical axis in the figure represents the particle size (nm) of a copolymer latex in logarithmic scale.

The horizontal axis represents specific volume of the particles of different sizes, when the volume of all the particles of a size appearing at the highest frequency is set to be 100%.

THE BEST EMBODIMENT FOR PRACTICING THE INVENTION

Hereinafter the present invention is specifically explained referring to working Examples, it being understood that the scope of the invention is in no way restricted thereto. In the following Examples, parts and percentages are by weight, unless specified otherwise.

The particle diameters of a copolymer latex were measured with a light-scattering type particle size measuring instrument (NICOMP MODEL 370: PACIFIC SCIENTIFIC Co.) and from which a volume average value of particle size (volume average particle diameter) was determined.

BM viscosity was measured with copolymer latices of solids content 60% or 67%, using a BM viscometer under the conditions of: No. 4 rotor, 20° C. and 60 rpm. Again, as for those copolymer latices whose viscosity exceeded 10,000 centipoises, their viscosity was measured using a BH viscometer, under the conditions of No. 6 rotor, 20° C. and 20 rpm.

EXAMPLE 1

Soft water 18 parts were mixed with 2-ethylhexyl acrylate 49 parts, styrene 50 parts, acrylic acid 1.0 part and sodium dodecylbenzenesulfonate 0.3 part, to form a monomeric emulsion.

Separately, soft water 25 parts were charged in a reactor and the temperature was raised to 80° C. Maintaining the temperature at 80° C., 1.0 part of 10% aqueous solution of ammonium persulfate was added thereto, and then the above monomeric emulsion was added consuming 5 hours.

When the amount of the fed monomers reached 50% by weight of the total monomers (2.5 hours from initiation of the addition), 0.3 part of sodium dodecylbenzenesulfonate and 5.0 parts of 10% aqueous solution of ammonium persulfate were added to the reactor.

After addition of the monomeric emulsion was terminated, the reaction system was aged for 2 hours at 80° C. to complete the reaction. The resultant copolymer latex showed a polymer conversion of 99% and had a solids content of 67% and a viscosity of 500 centipoises. The polymerization stability was good.

To the above copolymer latex water and aqueous ammonia was added without further concentration to adjust the latter's solids content to 60% and to pH 8. The obtained latex had a BM viscosity of 50 centipoises. The characteristics of this copolymer latex are shown in Table 1.

The result of measuring the particle size distribution of this copolymer latex with the light-scattering type particle size measuring instrument is presented in FIG. 1.

EXAMPLES 2–9

Example 1 was repeated except that composition of the monomers and the time for supplementing the emulsifier were changed to those as indicated in Table 1, to form copolymer latices. The results of their evaluation are shown in Table 1.

COMPARATIVE EXAMPLES 1–7

Example 1 was repeated except that composition of the monomers and the time for supplementing the emulsifier were changed to those as indicated in Table 2, to form copolymer latices. The results of their evaluation are shown in Table 2.

TABLE 1

|  |  | Example | | |
|---|---|---|---|---|
|  |  | 1 | 2 | 3 |
| Monomeric composition | styrene | 50 | 50 | 0 |
|  | butyl acrylate | 0 | 30 | 0 |
|  | 2-ethylhexyl acrylate | 49 | 19 | 80 |
|  | methyl methacrylate | 0 | 0 | 18 |
|  | acrylic acid | 1 | 1 | 0 |
|  | methacrylic acid | 0 | 0 | 2 |
|  | 1,3-butadiene | 0 | 0 | 0 |
| emulsifier | kind*1 | A | A | B |
|  | amount in the reactor before polymerization was initiated*2 (%) | 0 | 0 | 0 |
|  | amount needed for emulsifying monomers*3 (%) | 0.3 | 0.3 | 0.3 |
|  | amount supplementarily added on halfway the polymerization*4 (%) | 0.3 | 0.3 | 0.3 |
|  | time stage at which the supplementary addition was effected on halfway the polymerization*5 (%) | 50 | 50 | 50 |
| pH after termination of polymerization |  | 2.5 | 2.5 | 2.5 |
| BM viscosity ①*6 (centipoise) |  | 500 | 800 | 1200 |
| BM viscosity ②*7 (centipoise) |  | 50 | 55 | 120 |
| solids content ①*8 (%) |  | 67 | 67 | 67 |
| solids content ②*9 (*) |  | 60 | 60 | 60 |

TABLE 1-continued

|  |  | | | |
|---|---|---|---|---|
| latex charac- teris- tics | volume average particle size (nm) of all the particles | 756 | 658 | 671 |
|  | particle size distribution (nm) of smaller size particle group (a) | 170–300 | 160–250 | 165–288 |
|  | particle size distribution (nm) of larger size particle group (b) | 690–1170 | 550–900 | 530–860 |
|  | volumetric ratio of the particles constituting (a) to those constituting (b) | 20/80 | 20/80 | 15/85 |
|  | ratio of sum of particles constituting (a) plus those constituting (b) in the total particles (wt %) | 100 | 100 | 100 |

|  |  | Example | | |
|---|---|---|---|---|
|  |  | 4 | 5 | 6 |
| Mono- meric compo- si- tion | styrene | 70 | 50 | 50 |
|  | butyl acrylate | 0 | 0 | 0 |
|  | 2-ethylhexyl acrylate | 27 | 49 | 49 |
|  | methyl methacrylate | 0 | 0 | 0 |
|  | acrylic acid | 1 | 1 | 1 |
|  | methacrylic acid | 3 | 0 | 0 |
|  | 1,3-butadiene | 0 | 0 | 0 |
| emul- sifier | kind*1 | B | A | A |
|  | amount in the reactor before polymerization was initiated*2 (%) | 0 | 0 | 0 |
|  | amount needed for emulsifying monomers*3 (%) | 0.3 | 0.1 | 0.3 |
|  | amount supplementarily added on halfway the polymerization*4 (%) | 0.3 | 0.3 | 0.3 |
|  | time stage at which the supplementary addition was effected on halfway the polymerization*5 (%) | 50 | 50 | 50 |
| pH after termination of polymerization | | 2.0 | 2.5 | 2.5 |
| BM viscosity ①*6 (centipoise) | | 1500 | 300 | 800 |
| BM viscosity ②*7 (centipoise) | | 250 | 20 | 200 |
| solids content ①*8 (%) | | 67 | 67 | 67 |
| solids content ②*9 (%) | | 60 | 60 | 60 |
| latex charac- teris- tics | volume average particle size (nm) of all the particles | 755 | 769 | 637 |
|  | particle size distribution (nm) of smaller size particle group (a) | 178–244 | 170–300 | 153–256 |
|  | particle size distribution (nm) of larger size particle group (b) | 788–1150 | 850–1140 | 720–1060 |
|  | volumetric ratio of the particles constituting (a) to those constituting (b) | 25/75 | 23/77 | 24/76 |
|  | ratio of sum of particles constituting (a) plus those constituting (b) in the total particles (wt %) | 100 | 100 | 100 |

|  |  | Example | | |
|---|---|---|---|---|
|  |  | 7 | 8 | 9 |
| Mono- meric compo- si- tion | styrene | 50 | 70 | 40 |
|  | butyl acrylate | 0 | 0 | 0 |
|  | 2-ethylhexyl acrylate | 49 | 26 | 0 |
|  | methyl methacrylate | 0 | 0 | 18 |
|  | acrylic acid | 1 | 3 | 1 |
|  | methacrylic acid | 0 | 0 | 1 |
|  | 1,3-butadiene | 0 | 1 | 40 |
| emul- sifier | kind*1 | A | A | A |
|  | amount in the reactor before polymerization was initiated*2 (%) | 0 | 0 | 0 |
|  | amount needed for emulsifying monomers*3 (%) | 0.3 | 0.3 | 0.3 |
|  | amount supplementarily added on halfway the polymerization*4 (%) | 0.3 | 0.3 | 0.3 |
|  | time stage at which the supplementary addition was effected on halfway the polymerization*5 (%) | 60 | 50 | 50 |
| pH after termination of polymerization | | 2.5 | 2.5 | 2.5 |
| BM viscosity ①*6 (centipoise) | | 700 | 1200 | 1350 |
| BM viscosity ②*7 (centipoise) | | 150 | 130 | 140 |
| solids content ①*8 (%) | | 67 | 67 | 67 |
| solids content ②*9 (%) | | 60 | 60 | 60 |
| latex charac- teris- tics | volume average particle size (nm) of all the particles | 854 | 760 | 612 |
|  | particle size distribution (nm) of smaller size particle group (a) | 164–269 | 180–250 | 90–175 |
|  | particle size distribution (nm) of larger size particle group (b) | 690–1170 | 500–900 | 480–920 |
|  | volumetric ratio of the particles constituting (a) to those constituting (b) | 13/87 | 23/77 | 19/81 |
|  | ratio of sum of particles constituting (a) plus those constituting (b) in the total particles (wt %) | 100 | 100 | 100 |

TABLE 2

|  |  | Comparative Examples | | |
|---|---|---|---|---|
|  |  | 1 | 2 | 3 |
| Mono- meric compo- si- tion | styrene (parts) | 50 | 50 | 50 |
|  | butyl acrylate | 0 | 0 | 0 |
|  | 2-ethylhexyl acrylate | 35 | 50 | 49 |
|  | methyl methacrylate | 0 | 0 | 0 |
|  | acrylic acid | 7 | 0 | 1 |
|  | methacrylic acid | 8 | 0 | 0 |
| emul- sifier | kind*1 | A | A | A |
|  | amount in the reactor before polymerization was initiated*2 (%) | 0 | 0 | 0.1 |
|  | amount needed for emulsifying monomers*3 (%) | 0.3 | 0.3 | 0.3 |
|  | amount supplementarily added on halfway the polymerization*4 (%) | 0.3 | 0.3 | 0.3 |
|  | time stage at which the supplementary addition was effected on halfway the polymerization*5 (%) | 50 | 50 | 50 |
| pH after termination of polymerization | | 2.5 | 2.5 | 2.5 |
| BM viscosity ①*6 (centipoise) | | 15000 | Viscos- ity in- creased during poly- meri- zation reaction and the system solidi- fied | 19000 |
| BM viscosity ②*7 (centipoise) | | 2500 | | 7000 |
| solids content ①*8 (%) | | 67 | | 67 |
| solids content ②*9 (%) | | 60 | | 60 |
| latex charac- teris- tics | volume average particle size (nm) of all the particles | 898 | | 280 |
|  | particle size distribution (nm) of smaller size particle group (a) | 153–184 | | 132–332 |
|  | particle size distribution (nm) of larger size particle group (b) | 555–980 | | — |
|  | volumetric ratio of the particles constituting (a) to those constituting (b) | 15/85 | | 100/0 |
|  | ratio of sum of particles constituting (a) plus those constituting (b) in the total particles (wt %) | 100 | | 100 |

|  |  | Comparative Examples | | |
|---|---|---|---|---|
|  |  | 4 | 5 | 6 |
| Mono- meric compo- si- tion | styrene (parts) | 50 | 50 | 50 |
|  | butyl acrylate | 0 | 0 | 0 |
|  | 2-ethylhexyl acrylate | 49 | 49 | 49 |
|  | methyl methacrylate | 0 | 0 | 0 |
|  | acrylic acid | 1 | 1 | 1 |
|  | methacrylic acid | 0 | 0 | 0 |
| emul- sifier | kind*1 | A | A | A |
|  | amount in the reactor before polymerization was initiated*2 (%) | 0 | 0 | 0 |
|  | amount needed for emulsifying monomers*3 (%) | 0.3 | 0.3 | 0.3 |

TABLE 2-continued

|  |  |  |  |  |
|---|---|---|---|---|
|  | monomers*³ (%) |  |  |  |
|  | amount supplementarily added on halfway the polymerization*⁴ (%) | 0.3 | 0.3 | 0 |
|  | time stage at which the supplementary addition was effected on halfway the polymerization*⁵ (%) | 80 | 30 | 0 |
| pH after termination of polymerization |  | 2.5 | 2.5 | 2.5 |
| BM viscosity ①*⁶ (centipoise) |  | 3700 | 15000 | 20000 |
| BM viscosity ②*⁷ (centipoise) |  | 2450 | 4000 | 8250 |
| solids content ①*⁸ (%) |  | 67 | 67 | 67 |
| solids content ②*⁹ (%) |  | 60 | 60 | 60 |
| latex charac- teris- tics | volume average particle size (nm) of all the particles | 756 | 450 | 1280 |
|  | particle size distribution (nm) of smaller size particle group (a) | 168– 269 | 190– 350 | — |
|  | particle size distribution (nm) of larger size particle group (b) | 788– 1150 | 580– 970 | 986–1356 |
|  | volumetric ratio of the particles constituting (a) to those constituting (b) | 7/93 | 42/58 | 0/100 |
|  | ratio of sum of particles constituting (a) plus those constituting (b) in the total particles (wt %) | 100 | 100 | 100 |

|  |  | Comparative Example 7 |
|---|---|---|
| Mono- meric compo- si- tion | styrene (parts) | 50 |
|  | butyl acrylate | 0 |
|  | 2-ethylhexyl acrylate | 49 |
|  | methyl methacrylate | 0 |
|  | acrylic acid | 1 |
|  | methacrylic acid | 0 |
| emul- sifier | kind*¹ | A |
|  | amount in the reactor before polymerization was initiated*² (%) | 0 |
|  | amount needed for emulsifying monomers*³ (%) | 0.3 |
|  | amount supplementarily added on halfway the polymerization*⁴ (%) | 3 |
|  | time stage at which the supplementary addition was effected on halfway the polymerization*⁵ (%) | 50 |
| pH after termination of polymerization |  | 2.5 |
| BM viscosity ①*⁶ (centipoise) |  | 17500 |
| BM viscosity ②*⁷ (centipoise) |  | 3500 |
| solids content ①*⁸ (%) |  | 67 |
| solids content ②*⁹ (%) |  | 60 |
| latex charac- teris- tics | volume average particle size (nm) of all the particles | 380 |
|  | particle size distribution (nm) of smaller size particle group (a) | 95– 140 |
|  | particle size distribution (nm) of larger size particle group (b) | 560– 980 |
|  | volumetric ratio of the particles constituting (a) to those constituting (b) | 30/70 |
|  | ratio of sum of particles constituting (a) plus those constituting (b) in the total particles (wt %) | 100 |

In above Tables 1 and 2. *¹–*⁹ signify the following:
*¹A stands for sodium dodecylbenzenesulfonate, and B, sodium laurylsulfate
*²Used amount of emulsifier is expressed by weight % to 100 weight parts of total monomers
*³Used amount of emulsifier is expressed by weight % to 100 weight parts of total monomers
*⁴Used amount of emulsifier is expressed by weight % to 100 weight parts of total monomers
*⁵Ratio of added monomers is expressed by weight % based on the total amount of monomers at the time of supplementary addition of emulsifier on halfway the polymerization
*⁶BM viscosity or BH viscosity of each latex with a solids content of 67% after termination of the polymerization
*⁷BM viscosity of each latex with a solids content of 60% after pH adjustment to 8
*⁸solid concentration after termination of the polymerization
*⁹solids content after pH adjustment to 8.

The results as indicated in Tables 1 and 2 each lead to the evaluation as follows.

The copolymer latices of the present invention (Examples 1–9) show low viscosity and good polymerization stability, enabling high setting of the solids content at the time of polymerization reaction. Hence, it is unnecessary to raise concentration of the copolymer latices by condensing operations after the polymerization reaction. They are thus copolymer latices excelling in productivity.

When the monomers containing 85 wt % of ethylenically unsaturated monomers were used (Comparative Example 1), the copolymer latex with the solids content of 60%, at the stage where the pH was adjusted to 8 after termination of the polymerization reaction, had a high BM viscosity of 2500 centipoises and was difficult of practical handling.

When ethylencially unsaturated monomers only were used as the monomers (Comparative Example 2), the stability during the polymerization reaction was insufficient, and the copolymer latex exhibited increase in viscosity until solidification during the polymerization reaction.

When polymerization was started under the condition where the emulsifier had been added to the reactor before initiation of the polymerization (Comparative Example 3), particles belonging to the larger size particle group could not be obtained but those of the smaller size particle group only were formed, and hence viscosity of the copolymer latex rose high.

When the emulsifier was supplementarily added at the stage where the monomers added so far reached 80 wt % to the total amount of the monomers (Comparative Example 4), the volumetric ratio of the particles constituting the smaller size particle group became low, and the copolymer latex came to have a high viscosity, rendering its handling difficult at the time when its solids content was adjusted to 60% and pH, to 8.

When the emulsifier was supplementarily added at the stage where the monomers added so far reached 30 wt % to the total amount of the monomers (Comparative Example 5), the volumetric ratio of the particles constituting the smaller size particle group became high, and the copolymer latex came to have a high viscosity, rendering its handling difficult at the time when its solids content was adjusted to 60% and pH, to 8.

In the case where no emulsifier was supplementarily added on halfway the polymerization (Comparative Example 6), no particle belonging to the smaller size particle group was obtained but only the particles belonging to the larger size particle group were formed and the copolymer latex came to have a high viscosity, rendering its handling difficult at the time when its solids content was adjusted to 60% and pH, to 8.

In the case where the amount of the emulsifier which was supplementarily added on halfway the polymerization was 3 wt % to the total amount of the monomers (Comparative Example 7), the particle size of the smaller size particle group became small and the copolymer latex came to have a high viscosity, rendering its handling difficult at the time when its solids content was adjusted to 60% and pH, to 8.

EXAMPLE 10

To each 18.3 parts of those copolymer latices which were obtained in Examples and Comparative Examples, 51.3 parts of calcium carbonate (special grade calcium carbonate, Sankyo Seifun Co.), 0.2 part of sodium tripolyphosphate, 0.2 part of a thickener (Metrose 90 SH 15,000, Shin-etsu Kagaku Co.), 0.1 part of a defoaming agent (Adecanate B187, Asahi Denka Co.) and 13.6 parts of water were gradually added using TK Homodisper (an agitator manufactured by Tokushu Kika Kogyo Co.), to form paints.

The resulting paints were subjected to a water-resistance test under the following initial drying and a spraying operability test for evaluation. The results were as indicated in Table 3.

(1) Water-resistance Test with Initial Drying

One of the prescribed paints was applied onto a 4 mm-thick flexible board as specified by JIS A 5403 to provide a first layer at a rate of 0.75 kg/m$^2$, and dried for 3 hours under the conditions of 20° C. in temperature and 65% in humidity. Then a second layer was applied onto said first layer, at such a rate that the total application of the painted coating in combination with the first layer was 1.5 kg/m$^2$, followed by 16 hours' drying under the conditions of 20° C. in temperature and 65% in humidity, to provide a sample board for the test. The board was immersed in tap water and swelling, peeling and the like which occurred on the painted surface in consequence were observed.

(2) Spraying Operability Test

Thus formed paints were sprayed onto perpendicular wall surfaces with a lithin gun (caliber 6.5 mm, pressure 4–6 kgf/m$^2$), and the unevenness pattern and dripping condition of the paints were observed.

The results as indicated in Table 3 lead to the following evaluation.

The paints prepared of the copolymer latices of the present invention (Exp. Nos. 1 and 2) excelled not only in water-resistance but also in sprayability without occurrence of unevenness (craters) or dripping on the spray-coated surface. Thus they can be understood to have high three-dimensional designability.

In contrast, the paint prepared of the copolymer latex composed only of particles of larger particle size group (Exp. No. 3) exhibited poor water resistance and furthermore dripped after spraying. Also the paint prepared of the copolymer latex composed only of particles of smaller particle size group (Exp. No. 4) not only exhibited poor water-resistance but also allowed occurrence of unevenness (craters) on the spray-coated surface.

What is claimed is:

1. A copolymer latex with a total solids content of at least 67% by weight, which has a viscosity of 2,000 centipoises or less, as measured with a BM viscometer under the conditions of total solids content of 67% by weight and at room temperature, wherein said copolymer latex is prepared by a process which comprises continuously or intermittently adding, into an aqueous solution of a polymerization initiator containing no emulsifier, a monomeric component composed of 0.1–10% by weight of an ethylenically unsaturated carboxylic acid monomer and 90–99.9% by weight of another monomer copolymerizable therewith, and 0.1–1.5 parts by weight of an emulsifier, per 100 parts by weight of the total monomeric component to be used for obtaining the copolymer latex, said monomeric component and said emulsifier being added into the aqueous solution simultaneously and further comprises supplementarily adding 0.1–1 part by weight of the emulsifier per 100 parts by weight of the total monomeric component, in addition to the aforesaid emulsifier, while the amount of the added monomers is within the range of 40–60% by weight of the total monomeric component.

2. A copolymer latex as described in claim 1, which has a viscosity of 1500 centipoises or less as measured with a BM viscometer under the conditions of total solids content of 67% by weight and at room temperature.

3. A copolymer latex as described in claim 1, which when the copolymer latex is diluted to a total solids content of 60% by weight has a viscosity of 300 centipoises or less, as measured with a BM viscometer under the conditions of total solids content of 60% by weight and at room temperature.

4. A copolymer latex as described in claim 2, which when the copolymer latex is diluted to a total solids content of 60% by weight has a viscosity of 300 centipoises or less, as measured with a BM viscometer under the conditions of total solids content of 60% by weight and at room temperature.

5. A copolymer latex as described in claim 1, wherein the volume average particle size of all the particles of said copolymer latex is 500–1000 nm.

6. A copolymer latex as described in claim 1, wherein said copolymer latex has a volume average particle size of all the particles ranging from 50–1,000 nm, which comprises two

TABLE 3

| | Examples | | Comparative Examples | |
|---|---|---|---|---|
| Exp. No. | 1 | 2 | 3 | 4 |
| Latex | latex of Example 1 | latex of Example 8 | latex of Comparative Example 3 | latex of Comparative Example 6 |
| Solids content of paint (%) | 75 | 75 | 75 | 75 |
| B viscosity of paint (centipoise)*$^1$ | 25000 | 33000 | 53500 | 98000 |
| Water-resistance test under the initial drying | No change after 7 days' immersion | No change after 7 days' immersion | Paint film dissolved after one day's immersion | Swelling occurred after 3 days' immersion |
| Spraying operability test — unevenness*$^2$ | ○ | ○ | ○ | X |
| Spraying operability test — dripping property*$^3$ | ○ | ○ | X | ○ |

*$^1$measured with BH viscometer (No. 7 rotor, 20 r.p.m.)
*$^2$○ indicates occurrence of no crater, and X indicates occurrence of craters
*$^3$○ indicates no paint dripping after spraying, and X indicates paint dripping occurred after spraying groups of a smaller size particle group (a) consisting of particles whose particle size ranges from 50–300 nm and a larger size particle group (b) consisting of particles whose particle size ranges from 400–1200 nm, and the total weight of the particles constituting group (a) and those constituting group (b) is at least 80% of the weight of all the particles and the volumetric ratio of the (a) group constituting particles to the (b) group constituting particles is 10:90 to 40:60.

7. A copolymer latex as described in claim 6, wherein the total weight of the particles constituting the group (a) and those constituting the group (b) is 100% of the weight of all the particles.

8. A copolymer latex as described in claim 6, wherein the ratio of the total volume of the (a) group particles to the total volume of the (b) group particles ranges from 15:85 to 35:65.

9. A copolymer latex as described in claim 6, wherein the ethylenically unsaturated carboxylic acid monomer is ethylenically unsaturated monocarboxylic acid.

10. A copolymer latex as described in claim 6, wherein the amount of ethylenically unsaturated carboxylic acid monomer is 0.5–8% by weight of the total monomers to be used for obtaining the copolymer latex.

11. A copolymer latex as described in claim 6, wherein the another monomer copolymerizable with the ethylenically unsaturated carboxylic acid monomer is an aromatic vinyl monomer, ethylenically unsaturated carboxylic acid ester monomer or a conjugated diene monomer.

12. A process for producing a copolymer latex with a total solids content of at least 67% by weight, which has a viscosity of 2000 centipoises or less, as measured with a BM viscometer under the conditions of total solids content of 67% by weight and at room temperature, which process comprises continuously or intermittently adding, into an aqueous solution of a polymerization initiator containing no emulsifier, a monomeric component composed of 0.1–10% by weight of an ethylenically unsaturated carboxylic acid monomer and 90–99.9% by weight of another monomer copolymerizable therewith, and 0.1–1.5 parts by weight of an emulsifier, per 100 parts by weight of the total monomer component to be used for obtaining the copolymer latex, said monomeric component and said emulsifier being added into the aqueous solution simultaneously and further comprises supplementarily adding 0.1–1 part by weight of the emulsifier per 100 parts by weight of the total monomeric component, in addition to the aforesaid emulsifier, while the amount of the added monomers is within the range of 40–60% by weight of the total monomeric component.

13. A process for producing a copolymer latex as described in claim 12, wherein the polymerization initator is a water-soluble initiator.

14. A process for producing a copolymer latex as described in claim 12, wherein the amount of the polymerization initiator used is 0.1–2% by weight based on the total monomeric components used for obtaining the copolymer latex.

15. A process for producing a copolymer latex as described in claim 12, wherein the supplementary emulsifier is added at the time when the amount of the monomers added is within a range of 45–55% by weight of the total monomeric components to be used for obtaining the copolymer latex.

16. A process for producing a copolymer latex as described in claim 12, wherein the amount of supplementary emulsifier is 0.2–0.8 part by weight based on 100 parts by weight of the total monomeric components to be used for obtaining the copolymer latex.

17. Paint compositions comprising a copolymer latex as described in claim 1, as an essential component.

18. A process for producing a copolymer latex having a solids content of at least 67% by weight, which has a viscosity of 300 to 2000 centipoises as measured with a BM viscometer under the conditions of total solids content of 67% by weight and at room temperature which comprises the continuous addition, into an aqueous solution of a polymerization initiator containing no emulsifier, a monomeric component composed of 0.1–10% by weight of an ethylenically unsaturated carboxylic acid monomer and 90–99.9% by weight of another monomer copolymerizable therewith, and 0.1–1.5 parts by weight of an emulsifier, per 100 parts by weight of the total monomeric component to be used for obtaining the copolymer latex, and further comprises supplementarily adding 0.1–1 part by weight of the emulsifier per 100 parts by weight of the total monomeric component, in addition to the aforesaid emulsifier, while the amount of the added monomers is within the range of 40–60% by weight of the total monomeric component.

19. The process for producing a copolymer latex as described in claim 18 which additionally comprises diluting the copolymer latex having a solids content of at least 67% by weight and a viscosity of 300 to 2000 centipoises to obtain a copolymer latex having a total solids content of 60% by weight and a viscosity of 20 to 300 centipoises at room temperature.

* * * * *